US007353276B2

(12) United States Patent
Bain et al.

(10) Patent No.: US 7,353,276 B2
(45) Date of Patent: Apr. 1, 2008

(54) BI-DIRECTIONAL AFFINITY

(75) Inventors: William L. Bain, Bellevue, WA (US);
Kyril Faenov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/365,810

(22) Filed: Feb. 13, 2003

(65) Prior Publication Data
US 2004/0205250 A1   Oct. 14, 2004

(51) Int. Cl.
G06F 15/167 (2006.01)
G06F 15/16 (2006.01)

(52) U.S. Cl. .................. 709/225; 709/214; 709/217

(58) Field of Classification Search ........ 709/223–226, 709/229; 711/147, 213; 370/230; 707/217
See application file for complete search history.

(56) References Cited

U.S. PATENT DOCUMENTS

| 6,067,545 | A | 5/2000 | Wolff |
| 6,070,191 | A * | 5/2000 | Narendran et al. ......... 709/226 |
| 6,078,943 | A | 6/2000 | Yu |
| 6,119,143 | A | 9/2000 | Dias et al. |
| 6,185,601 | B1 | 2/2001 | Wolff |
| 6,351,775 | B1 | 2/2002 | Yu |
| 6,424,992 | B2 | 7/2002 | Devarakonda et al. |
| 6,571,288 | B1 | 5/2003 | Sarukkai |
| 6,587,866 | B1 | 7/2003 | Modi et al. |
| 6,671,259 | B1 | 12/2003 | He et al. |
| 6,748,413 | B1 | 6/2004 | Bournas |
| 6,748,414 | B1 | 6/2004 | Bournas |
| 6,779,016 | B1 | 8/2004 | Aziz et al. |
| 6,871,347 | B2 | 3/2005 | Hay |
| 6,920,485 | B2 * | 7/2005 | Russell ................ 709/214 |
| 6,985,956 | B2 * | 1/2006 | Luke et al. ............ 709/229 |
| 6,999,998 | B2 * | 2/2006 | Russell ................ 709/213 |
| 7,047,315 | B1 | 5/2006 | Srivastava |
| 7,111,063 | B1 * | 9/2006 | Clark et al. ............ 709/225 |
| 2003/0191848 | A1 * | 10/2003 | Hesselink et al. ....... 709/229 |

OTHER PUBLICATIONS

U.S. Appl. No. 10/184,870, filed Jun. 28, 2002, Parham et al.
U.S. Appl. No. 10/186,899, filed Jun. 28, 2002, House et al.
H. Bryhni et al. *A Comparison of Load Balancing Techniques for Scalable Web Servers.* IEEE Network, vol. 14, No. 4, pp. 58-64 (2000).
A. Fox et al. *Cluster-Based Scalable Network Services.* Proceedings of 16th ACM Symposium on Operating Systems Principles, pp. 78-91 (1997).

(Continued)

*Primary Examiner*—John Follansbee
*Assistant Examiner*—Jude J Jean-Gilles

(57) ABSTRACT

A new network load balancing/firewall node for use in a system including multiple network load balancing/firewall nodes is disclosed. The network load balancing/firewall applies bi-directional load balancing affinity with regard to requests from external clients and corresponding responses from internal network servers. An external network load balancing adapter executes a load-balancing algorithm to determine whether a received client request is accepted by the network load balancing/firewall node. A firewall utility processes the received client request and maintains state information associated with the received client request. An internal network load balancing adapter executes a complementary load-balancing algorithm simultaneously on each network load balancing/firewall node to ensure that the same network load balancing/firewall node accepts a response from an internal network server corresponding to the received client request.

14 Claims, 12 Drawing Sheets

OTHER PUBLICATIONS

M. Karaul et al. *WebSeAl: Web Server Allocation*. Technical Report TR1997-752, Department of Computer Science, New York University (Dec. 1997).

B. Narendran et al. *Data Distribution Algorithms for Load Balanced Fault-Tolerant Web Access*. Proceedings of 16th Symposium on Reliable Distributed Systems, pp. 97-106 (IEEE, 1997).

S. Haldar et al. "An affinity-based dynamic load balancing protocol distributed transaction processing systems", Performance Evaluation 17, 1993, pp. 53-71.

R. Rivest "The MD5 Message-Digest Algorithm", MIT Laboratory for Computer Science and RSA Data Security, Inc., Apr. 1992.

* cited by examiner

BI-DIRECTIONAL AFFINITY

RELATED APPLICATIONS

This application is related to U.S. application Ser. No. 10/186,899, filed Jun. 28, 2002, entitled "Bi-Directional Affinity Within A Load-Balancing Multi-Node Network Interface," the contents of which are expressly incorporated in their entirety including any references therein.

AREA OF THE INVENTION

The present invention generally relates to the area of computer networks and implementation of load balancing within such networks. More particularly, the present invention is directed to load balancing in connection with multi-node network interfaces interposed between external clients and servers on an internal network.

BACKGROUND OF THE INVENTION

More and more today computer end users are reaching out over the Internet to gather information and news located at remote servers. Often, in order to meet user demand, the requested information resides on multiple servers working in concert to fulfill information requests. Allowing multiple users to access the same data servers and execute the same application requires sophisticated network management capable of ensuring that servers are reliable, highly available and scalable. One of the more challenging aspects of network management is balancing server load in order to handle overwhelming demand for access to Internet locales.

"Load balancing" is the term given to a technique for apportioning the work of serving a network task, function, application etc. among two or more servers (also referred to as "hosts"). According to the technique, a number of servers are grouped in a "cluster" such that client requests are distributed amongst the servers in the cluster ensuring that no one server becomes overloaded. For example, load balancing is especially important for networks where it is difficult to predict the number of requests that will be issued to any given server, such as a high-traffic Web site host.

One common approach to load balancing is referred to as the "round-robin" approach (e.g., as is used in round-robin domain name servers). Under this method, application requests are evenly distributed amongst servers in a cluster such that each server receives a share of the load. The round-robin approach, however, has limitations such as not taking into consideration the different performance characteristics of individual servers in the cluster and not determining whether the designated server is actually available. Consequently, it is possible to overload a slower server in the cluster or send a request to a server that is not available simply because the designated server is the next in line to receive a request.

Another approach to load balancing requires the use of dedicated hardware utilized solely for the purpose of load balancing. For example, dedicated computers executing only load-balancing applications are used to accept connections on behalf of all servers in a cluster, monitor the cluster and assign application requests to servers in the cluster on the basis of performance and availability. Another hardware example is the use of network switches to create a cluster of servers and to divide traffic amongst the available servers in the cluster. A dedicated hardware solution, however, is problematic because it presents a single point of failure for the system such that if the computer or switch fails, the cluster of servers also fails.

An alternative to dedicated hardware, and a solution to the overhead expenses and hardware failure, is software-based load balancing. An example of a software-based solution is the MICROSOFT NETWORK LOAD BALANCING server, also referred to as the "NLB." Microsoft's NLB is a symmetric, fully distributed algorithm that executes concurrently on each server in the cluster. The servers communicate with each other to monitor the availability of each other server and to determine mutually which server in the cluster handles the application request.

An example of an implementation of load balancing in the prior art is illustrated in FIG. 1 wherein load balancing is performed by network interface servers for two sets of requests (e.g., requests from clients on the Internet submitting requests to a set of published servers and the published servers returning responses). In this scenario, the motivation is to ensure that the client requests and server responses are handled by the same network interface server. As depicted in FIG. 1, networked computer system 100 includes one or more external client computers 110 connected via data links 115 and Internet 120 to a cluster of external network interface servers 130. The cluster of external network interface servers 130 is connected to a series of published servers 150 via data links 135 and 155 and a router 140. With continued reference to FIG. 1, when the external client 110, having IP Address A, makes a connection to one of the internal published servers 150, a data request message 117 is routed to server cluster 130, having IP Address B. Upon receipt, server cluster 130 executes a server selection algorithm based upon the source and destination IP addresses and then one of the servers in the cluster 130 accepts data request message 117. Following message path 1 in the example of FIG. 1, data request message 117 arrives at Server M as a result of executing the selection algorithm using IP Address A and IP Address B.

Server M then makes a connection to the appropriate published server 150 by translating the IP address of public server cluster 130 (i.e., IP Address B) to the private IP address of the published server. In this example, the IP address of Server M identified in data request message 137 translates to IP Address C. In this instance, data request message 137 follows message path 2 from Server M to Published Server N. When constructing a response message, Published Server N swaps the source and destination IP addresses in the response message. In the above example, the source IP address changes from IP Address A to IP Address C and the destination IP address changes from IP Address C to IP Address A. Thereafter, data response message 157 is routed back to server cluster 130, the predefined default gateway for published servers 150. Because the destination address of the response message is unknown to the published server, all response messages from published servers 150 are forwarded to an internal IP address for server cluster 130 used by data links 135.

Upon arrival of data response message 157, server cluster 130 executes a server selection algorithm based on the source and destination addresses. In this scenario, the response message may be sent to a server different than the server that processed the client data request 117 and initiated the connection with the published server. Following message path 3 in the example of FIG. 1, data response message 157 arrives at Server 2 as a result of executing the selection algorithm.

Under the above known load-balancing scheme, the server cluster determines which server processes the message by repeatedly executing the selection algorithm using the source and destination IP addresses. Thus, the return path through the external network interface is not ensured to be the same as the original path from the external client into the external network interface. Because the paths are not necessarily the same, the techniques presently available provide an insufficient means to load balance networked systems because they do not solve the problem of routing response messages back to the same server which is necessary for ISA and other applications that maintain state information for the client on server M.

SUMMARY OF THE INVENTION

The present invention comprises a new method and structure for implementing "bi-directional affinity" in a load-balancing environment. Bi-directional affinity ensures that requests from external clients and corresponding responses from internal servers are processed by the same external network interface server. More particularly, the present invention utilizes a complementary algorithm applied to address information during load balancing to ensure that the data response from the internal server is accepted by the same external network interface server that accepted and processed the data request.

The present invention comprises a new network load balancing/external network interface node for use in a system including multiple network load balancing/external network interface nodes. The network load balancing/external network interface ensures bi-directional load balancing affinity with regard to requests from external clients and corresponding responses from internal network servers. During the load-balancing process, each external network load balancing adapter executes a load-balancing algorithm to determine whether a received client request is accepted by the network load balancing/external network interface node. After server selection, an external network interface utility processes the received client request and maintains state information associated with the received client request. Thereafter, the client request is routed to an internal network server that processes the request and responds by routing a message to the internal load balancing adapter.

After receiving the response message, an internal network load balancing adapter executes a complementary load-balancing algorithm to determine which network load balancing/external network interface node shall receive the response message. The complementary load-balancing algorithm ensures that the same network load balancing/external network interface node accepts the response message from an internal network server corresponding to the received client request.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

In some situations, it is beneficial if the same server in a cluster processing a data request from an external client also processes a data response from a published server. It can be seen that there is a need for a method for effectuating "bi-directional affinity" such that a data response from a published server is always processed by the same server that processed the initial data request.

Figure 1:
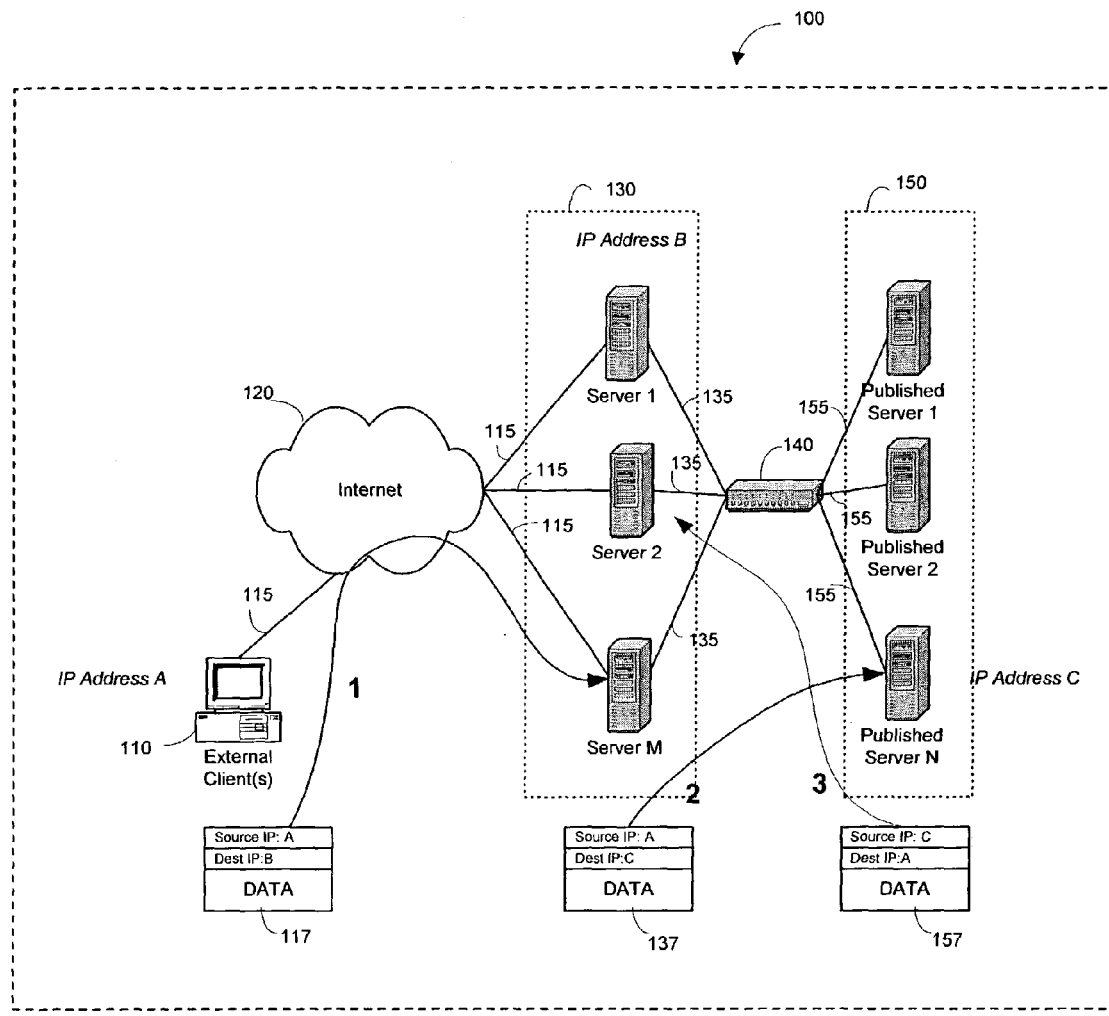
FIG. 1 is a schematic diagram of a computer network of the prior art illustrating a technique for load balancing a cluster of servers.
Figure 2:
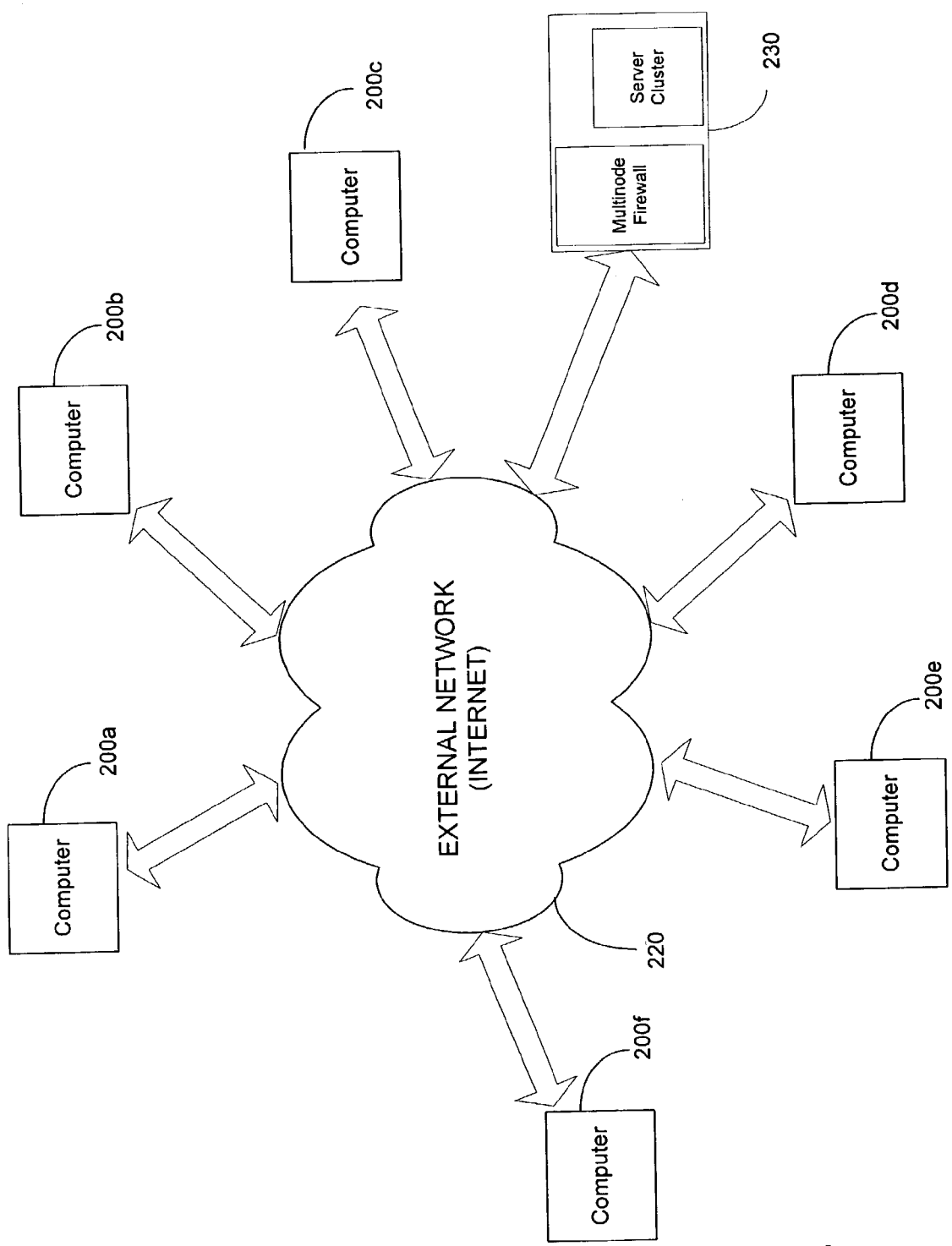
FIG. 2 is a schematic diagram of a networked computer system in which aspects of the present invention and/or portions thereof may be incorporated.

In an embodiment of the present invention, a bi-directional affinity load-balancing technique comprises server communication system software executed within a server computer operating environment such as the one depicted in FIG. 2, and in particular one that is configured to support potentially hundreds of thousands of concurrent network connections and data requests. Such a computing environment is potentially present in popular website server configurations that exist today. FIG. 2 illustratively depicts an example of a suitable operating environment within which the invention is implemented. The example network includes several computers 200a-f communicating with one another over a network 220, represented as a cloud. Network 220 may include any of many well-known components, such as routers, gateways, hubs, etc. and may allow computers 200a-f to communicate via wired and/or wireless media. The example network also includes a firewall protected server cluster 230 connected to network 220.

The invention is operational with numerous other general-purpose or special-purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
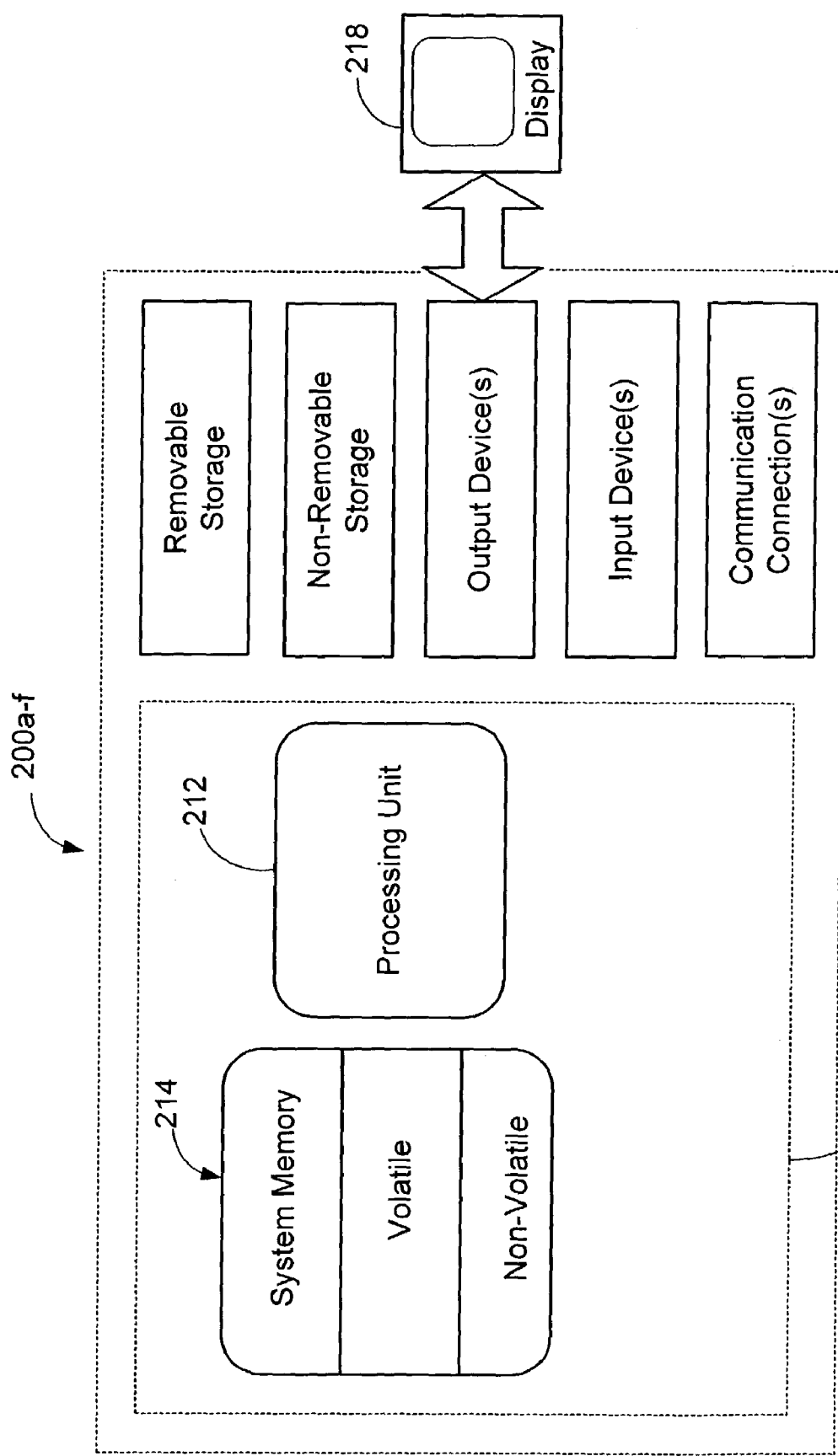
FIG. 3 is a block diagram of a general purpose computer in which aspects of the present invention and/or portions thereof may be incorporated.

Referring to FIG. 3, an example of a basic configuration for a load-balancing external network interface computer on which the invention described herein may be implemented is shown. In its most basic configuration, computers 200a-f typically include at least one processing unit 212 and memory 214. Depending on the exact configuration and type of the computer, the memory 214 may be volatile (such as RAM), non-volatile (such as ROM or flash memory) or some combination of the two. This most basic configuration is illustrated in FIG. 3 by dashed line 210. Additionally, the computer may also have additional features/functionality. For example, computers 200a-f may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by computers 200a-f. Any such computer storage media may be part of computers 200a-f.

Computers 200a-f may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. Computers 200a-f may also have input devices such as a keyboard, mouse, pen, voice input device, touch input device, etc. Output devices such as a display 218, speakers, a printer, etc. may also be included. All these devices are well known in the art and need not be discussed at length here.

Figure 4A:
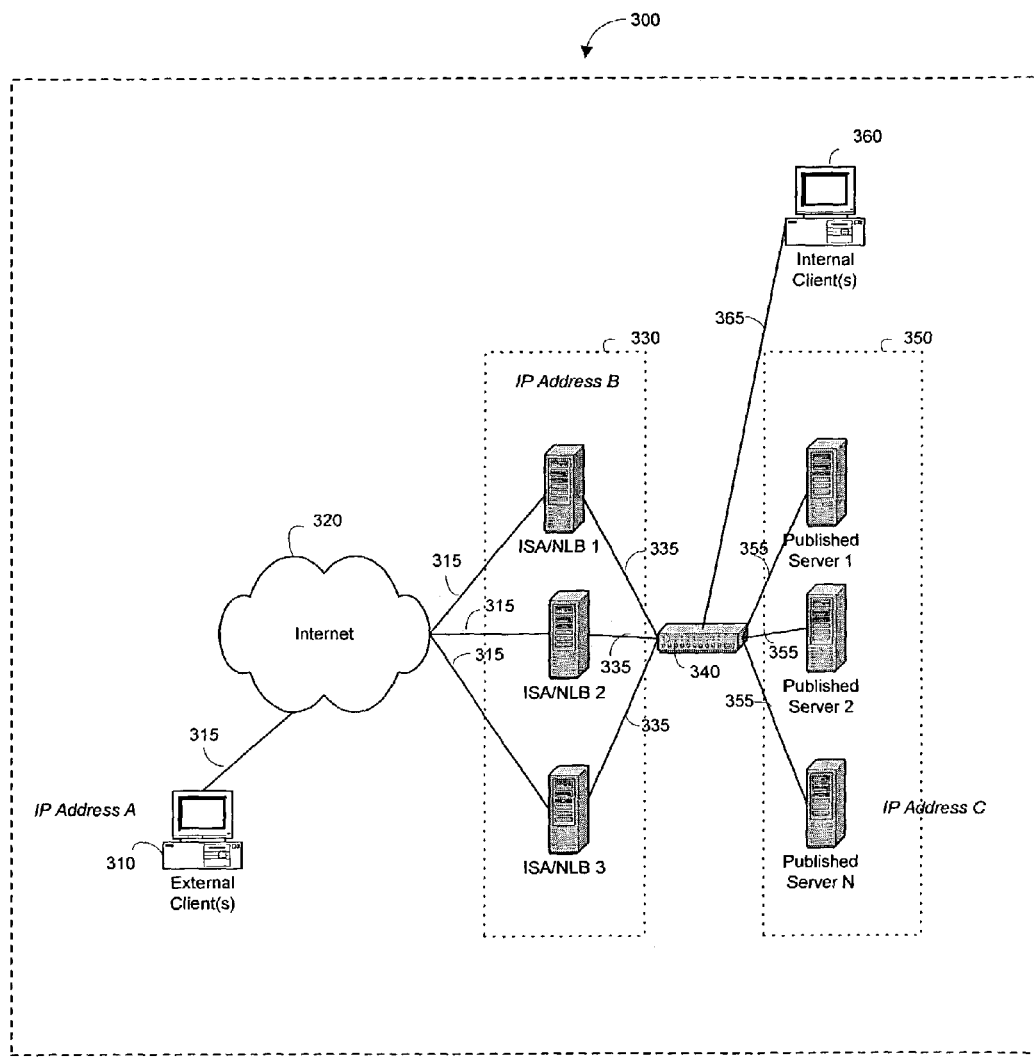
FIGS. 4a-e are schematic diagrams of a computer network illustrating a technique for load balancing a cluster of servers in accordance with one embodiment of the present invention.

Having described an exemplary computing environment for executing a method for load balancing interfaces in a multi-node network embodying the present invention, attention is directed to FIGS. 4a-e that depict an exemplary computer network application environment within which the present invention is practiced. As shown in FIG. 4a, networked computer system 300 includes one or more external client computers 310 connected via data links 315 and Internet 320 to a cluster of M network interface servers 330 (referenced as ISA/NLB 1, ISA/NLB 2 and ISA/NLB M). Data links 315 comprise any appropriate data link, for example, a local area network or a wide area network. Various data links are employed in alternative embodiments of the invention. The cluster of network interface servers 330 is also connected, via data links 335 and 355 and a router 340, to a series of N published servers 350 (referenced as Published Server 1, Published Server 2 and Published Server N). Published servers 350 comprise any appropriate server accessible for the purpose of providing content, for example, a website host.

In an embodiment of the present invention as shown in FIG. 4a, the networked computer system 300 includes one or more internal client computers 360 connected to the cluster of network interface servers 330 and the series of published servers 350 via data links 335, 355 and 365 and router 340. As will be explained further herein below, external clients 310 and internal clients 360 request/receive data information from published servers 350 by sending/receiving a request/response message. In order to manage the traffic associated with data requests and responses, computer network system 300 includes a technique for load balancing data traffic across the cluster of network interface servers 330.

In an embodiment of the present invention, each network interface server within the cluster 330 functions as a firewall simultaneously acting as a secure gateway to Internet 320 for internal clients 360 and protecting against intrusions from external clients 310. An implementation example of such a firewall is Microsoft's Internet Security and Acceleration Server also referred to as "ISA" (a product of Microsoft Corp. of Redmond, Wash.). To load balance the data traffic amongst the cluster of ISA servers 330, each ISA server executes Microsoft's NLB application as a network driver (i.e., a program that controls a network interface card). NLB uses a fully distributed filtering algorithm to partition client traffic among the cluster of network interface servers 330. To accomplish this task, an identical copy of the NLB driver runs in parallel on each server in the cluster 330. When inspecting an arriving request, all hosts simultaneously perform a statistical mapping to quickly determine which host in the cluster 330 should handle the request.

The NLB drivers, executing concurrently on each ISA server in the cluster 330, communicate with each other through the use of periodically exchanged multicast or broadcast heartbeat messages to monitor the availability of each ISA server and to determine mutually which ISA server in the cluster accepts the application request. When the state of the cluster 330 changes (e.g., a host fails, leaves, or joins the cluster 330), NLB invokes a process known as "convergence," in which the hosts exchange heartbeat messages to determine a new, consistent state of the cluster. At the completion of convergence, client traffic for a failed host is redistributed to the remaining hosts. Alternatively, if a host is added to the cluster, convergence allows this host to receive its share of load-balanced traffic.

Figure 5:
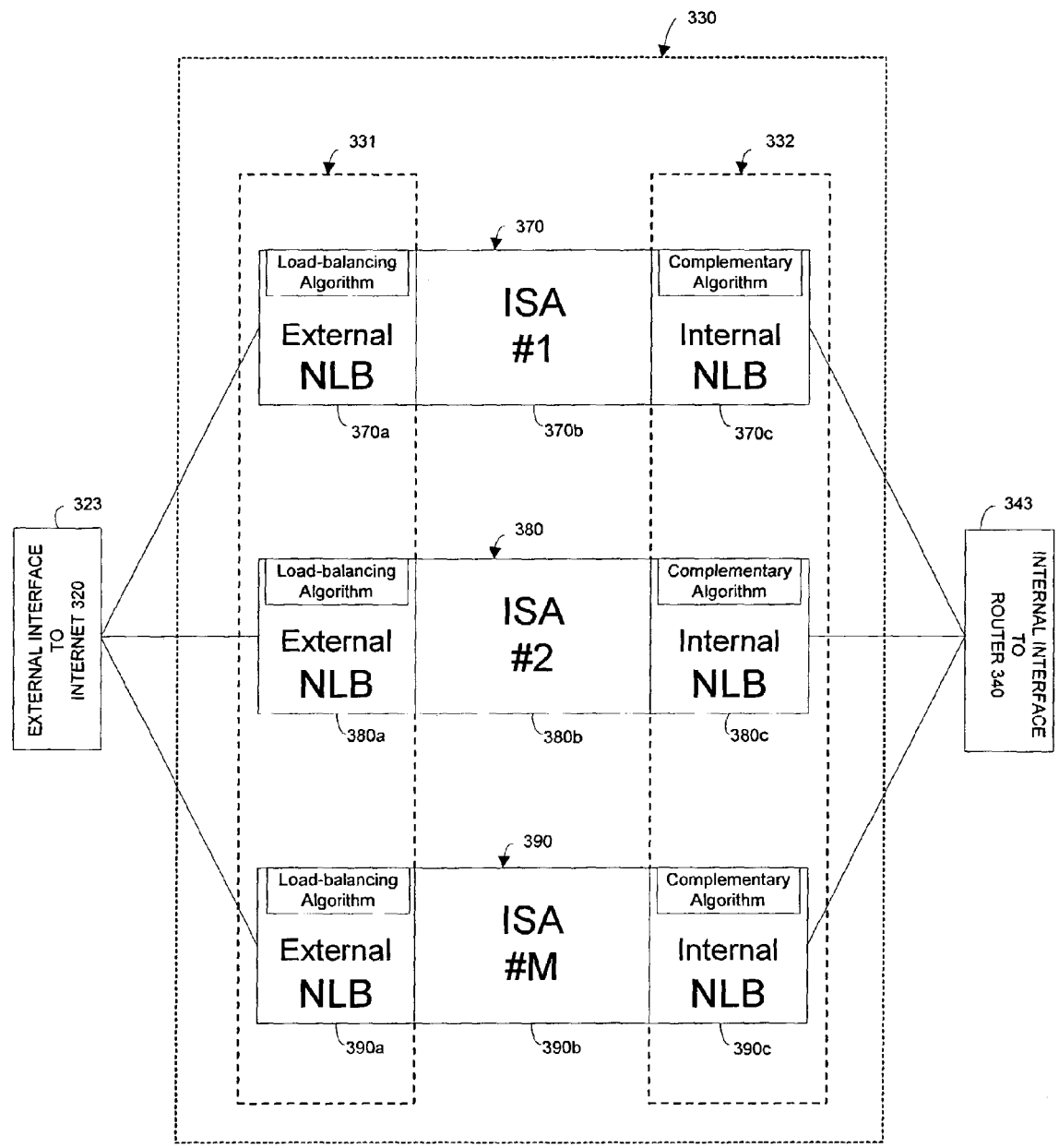
FIG. 5 is a block diagram of a multiple network load balancing/external network interface nodes in which aspects of the present invention and/or portions thereof may be incorporated.

Turning briefly to FIG. 5, an exemplary cluster of ISA/NLB servers 330 is schematically depicted having a plurality of M network interface servers (referenced as ISA/NLB #1 370, ISA/NLB #2 380 and ISA/NLB #M 390). Each ISA server uses an NLB to balance traffic on the external interfaces 323 and internal interfaces 343 of the ISA server cluster 330. During the load-balancing process, incoming data requests from external clients 310 via Internet 320 and outgoing data requests from internal clients 360 via router 340 are routed to the appropriate ISA server through the use of a load-balancing process. The goal of the load-balancing process is to balance incoming and outgoing data requests amongst the servers in the ISA cluster 330. According to an embodiment of the invention, data responses from the published server 350, however, are not balanced amongst the ISA servers 330, but rather incorporate bi-directional affinity through the use of a complementary algorithm that ensures responses are routed to the same ISA server that processed the external request.

With reference to FIG. 5, each server includes an external network load balancing adapter (i.e., network interface card) 370a, 380a and 390a that executes a load-balancing algorithm to determine whether a received client request is accepted by one of the servers 370b, 380b or 390b. Similarly, each server includes an internal network load balancing adapter 370c, 380c, and 390c that executes a complementary load-balancing algorithm ensuring that the server 370b, 380b or 390b that accepts a response from the published server corresponds to the same server that accepted the external client request. As will be explained further herein below, each internal network load balancing adapter 370c, 380c, and 390c comprises a default load-balancing algorithm and a complementary load-balancing algorithm.

According to the present invention, a mapping of NLB adapters is used to provide global load balancing state for all external and internal load balancing adapters participating in the bi-directional affinity process. In one embodiment of the present invention, external load balancing adapters are grouped in an external NLB cluster and internal load balancing adapters are grouped in an internal NLB cluster. With reference to network interface server cluster 330 in FIG. 5, external load balancing adapters 370a, 380a and 390a are grouped in an external NLB cluster 331. Similarly, internal load balancing adapters 370c, 380c and 390c are grouped in an internal NLB cluster 332. According to the present invention, external NLB cluster 331 and internal NLB cluster 332 use the same global load balancing state to implement bi-directional affinity. Using the same global load balancing state, along with appropriate use of the complementary algorithm, ensures that request messages and response messages are processed by the same network interface server.

Figure 4B:
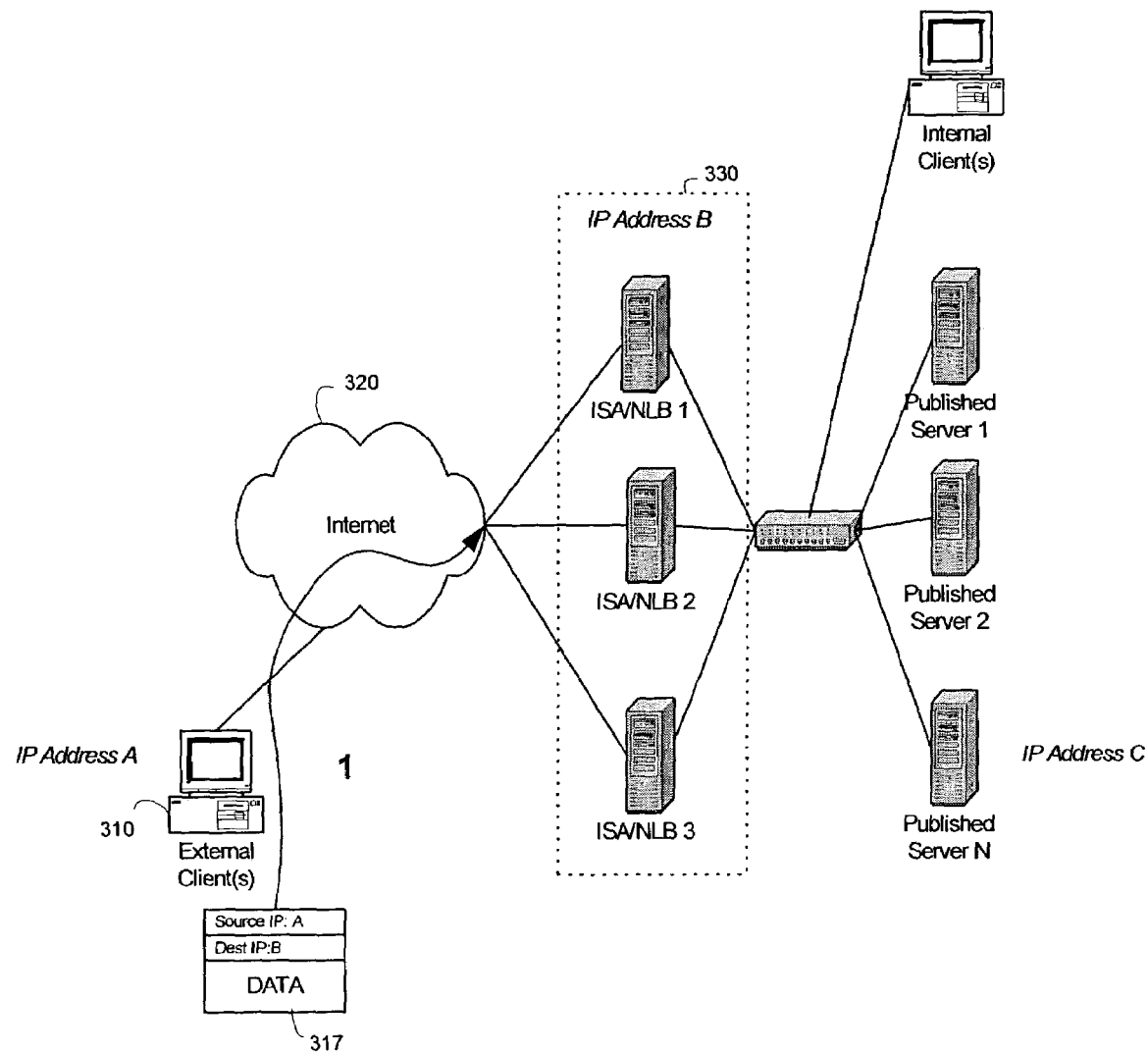

Turning to FIG. 4b, when a connection request is initiated by external client 310 to a published server behind the ISA firewall 330, the external client 310 first connects to the external interface of ISA/NLB cluster 330 by forwarding a request message 317. In this example, data request message 317, having a source IP address of IP Address A and a destination IP address for ISA/NLB cluster 330 of IP Address B, follows message path 1. When message request 317 arrives at the external interface of the cluster 330, the external NLB adapters 370a, 380a and 390a (as shown in FIG. 5) execute a server selection algorithm based upon the source or destination IP addresses (i.e., IP Address A or IP Address B) as a method for load balancing incoming data requests. Alternatively, the server selection algorithm uses any part of the communication header, alone or in combination, as a method for load balancing. In one embodiment of the invention, NLB adapters 370a, 380a and 390a (as shown in FIG. 5) execute the server selection algorithm using the source IP address. The result of the server selection algorithm determines which ISA server 370b, 380b or 390b (as shown in FIG. 5) in the ISA server cluster 330 accepts request message 317. In the example of FIG. 4b, the server selection algorithm determines that ISA/NLB M accepts message 317.

Figure 4C:
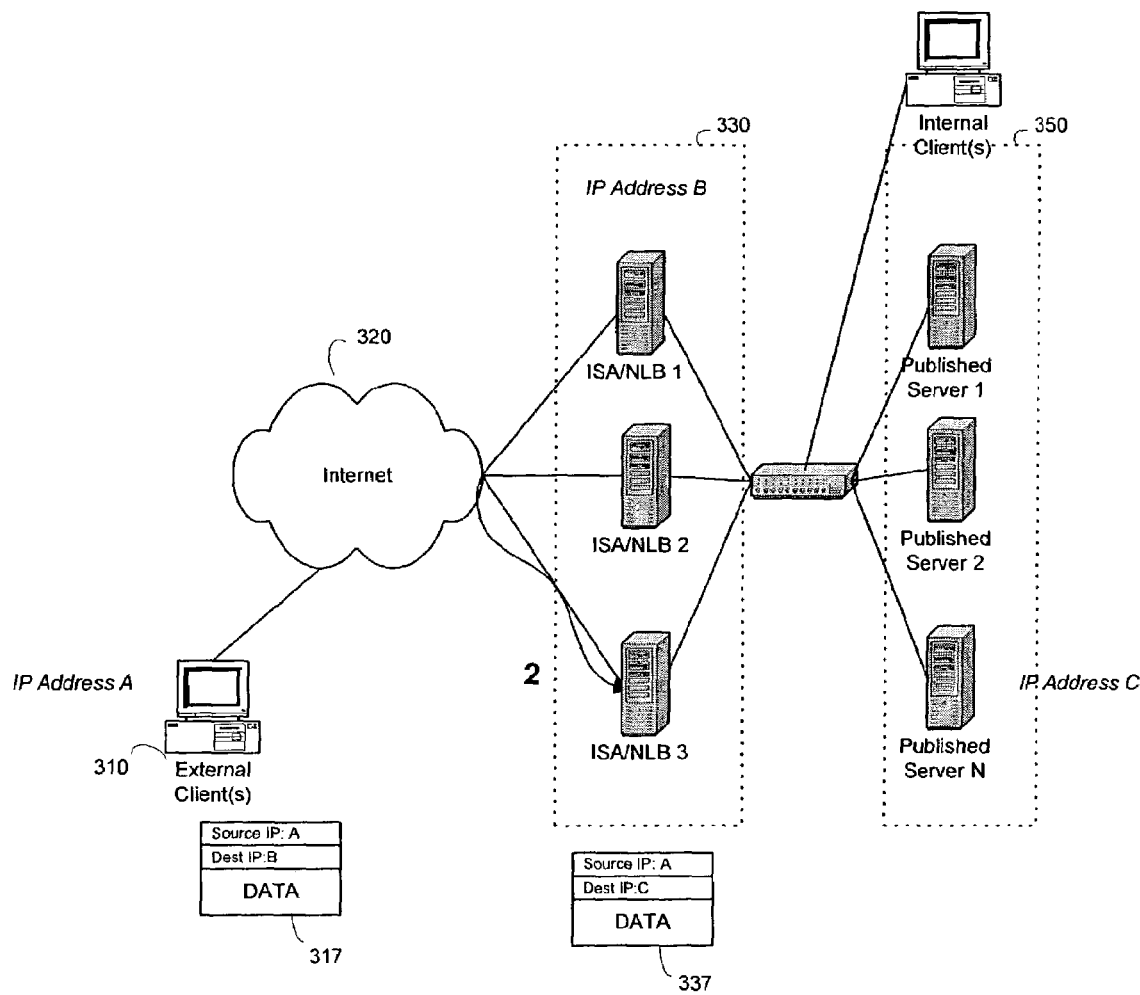

Turning to FIG. 4c, data request message 317 is routed to ISA/NLB M along message path 2. After determining which published server in the series of published servers 350 should receive message request 317, ISA/NLB M routes the request message 337 to the appropriate published server by effectively translating the destination IP address to that of the appropriate published server. In the example, data message 337 translates the destination IP address from IP Address B to IP Address C of Published Server N. Before routing data message 337 to Published Server N (i.e., IP Address C), ISA/NLB M saves the state information associated with the external client request.

Figure 4D:
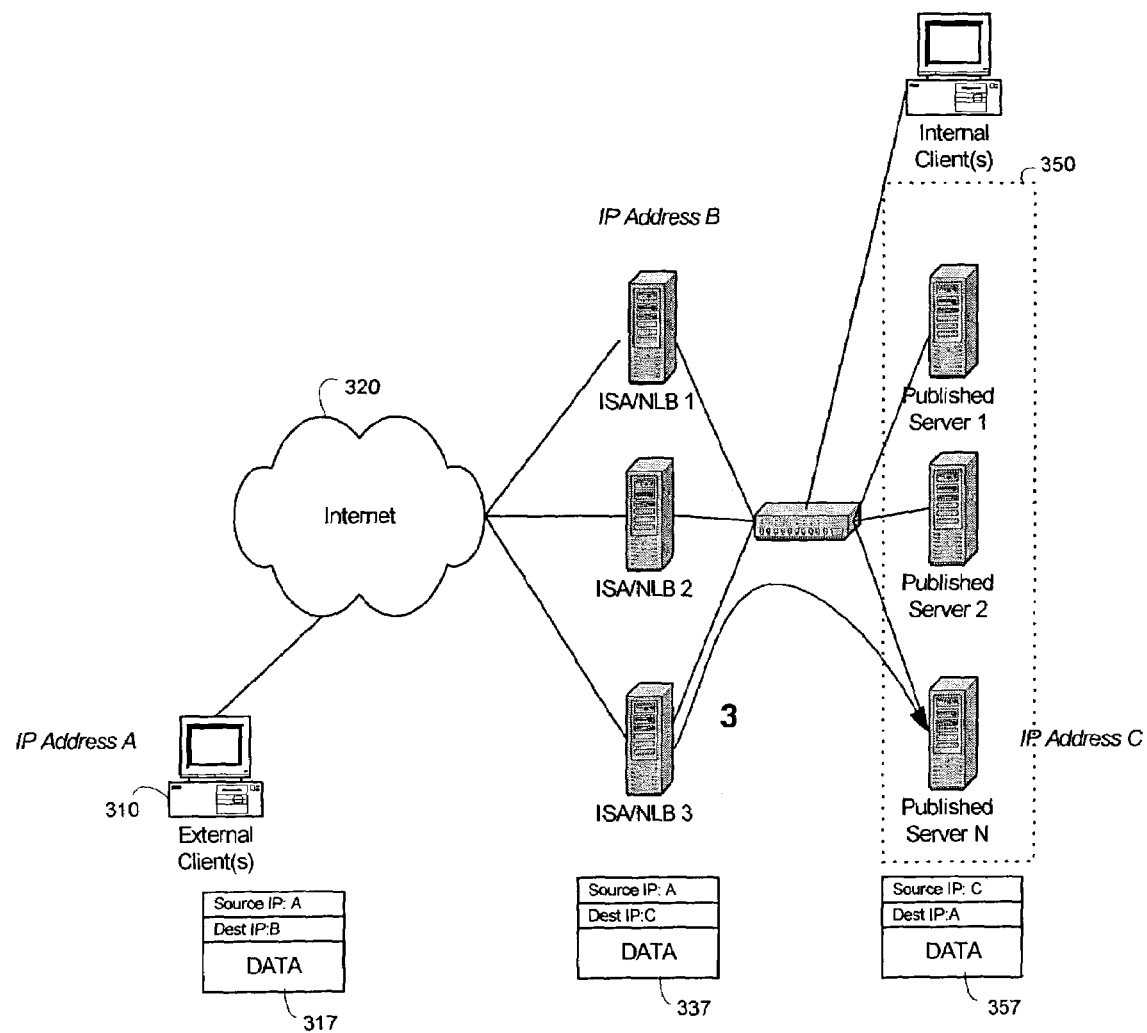

Turning to FIG. 4d, ISA/NLB M routes data request message 337 to Published Server N having IP Address C along message path 3. When Published Server N responds to the request, it first swaps the source and destination information stored in data message 357. As depicted in FIG. 4d, data response message 357 swaps the source and destination IP addresses such that the source address changes to IP Address C (i.e., Published Server N) and the destination address changes to IP Address A (i.e., external client 310).

Figure 4E:
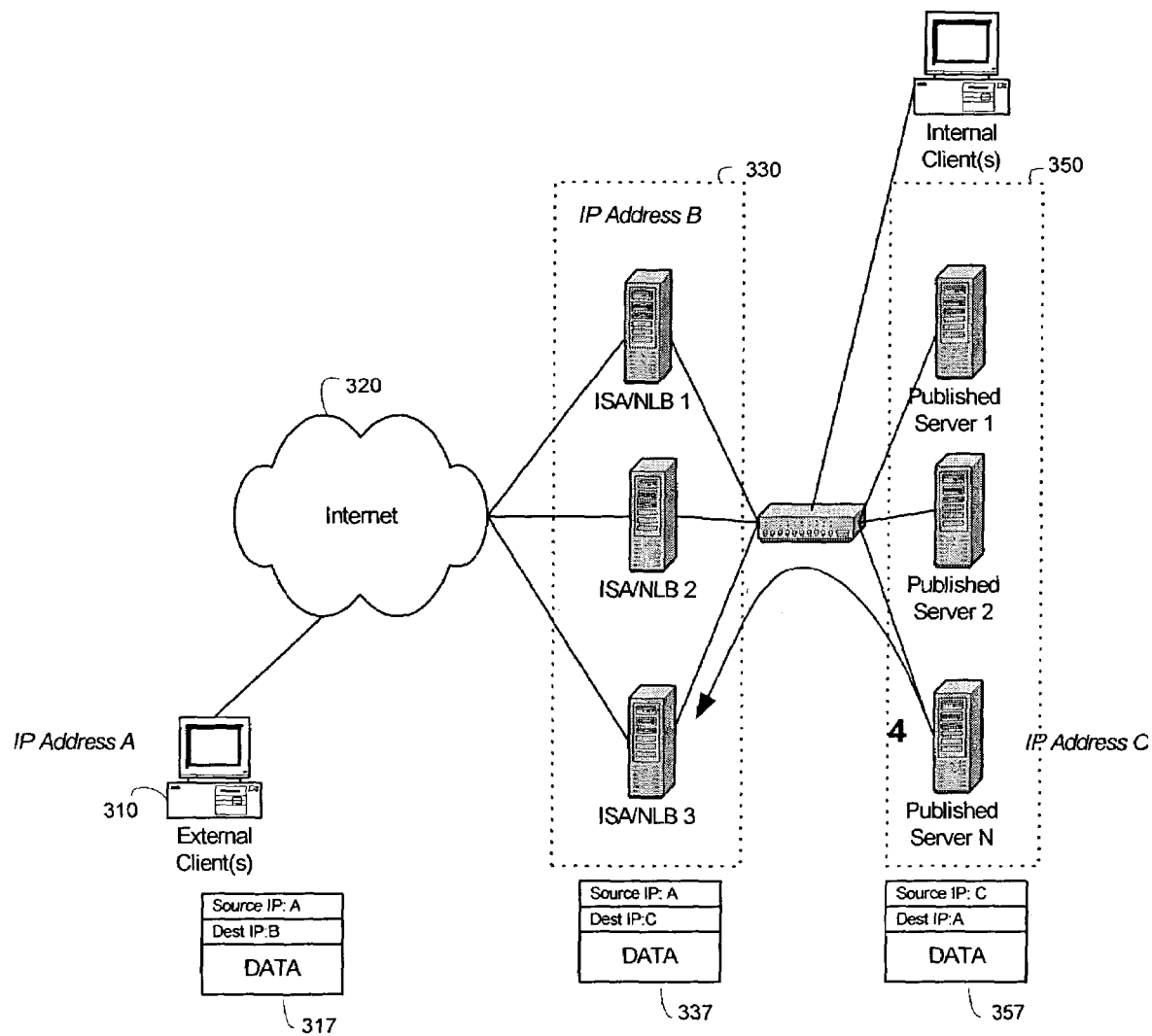

Next, as depicted in FIG. 4e, data response message 357 is routed back through the network and router to the cluster of NLB/ISA servers 330. In order to preserve bi-directional affinity, when response message 357 arrives at the internal interface of server cluster 330, NLB executes a complementary server selection algorithm to determine which NLB/ISA server accepts response message 357. The NLB driver employs a fully distributed complementary algorithm to map response messages to the appropriate NLB/ISA server in the cluster 330. When inspecting a response message 357, all NLB/ISA servers in the cluster 330 simultaneously perform the complementary mapping to quickly determine which NLB/ISA server should handle the response message 357. Simultaneously executing the complementary algorithm on each NLB/ISA server in the cluster ensures that response message 357 is directed to the same server that processed the initial data request 317.

In one embodiment of the present invention wherein the external interface uses the source IP address (i.e., IP Address A) for server selection of incoming client requests, the complementary server selection algorithm executes based upon the destination address (i.e., the IP address of the client computer 310 shown as IP Address A in FIG. 4) in response message 357, rather than the source IP address. With reference to FIG. 4e, the NLB executes the complementary server selection algorithm upon the destination IP address (i.e., IP Address A) instead of executing the default algorithm upon the source IP address (i.e., IP Address C). Executing the server selection algorithm based upon IP Address A ensures that response message 357 is accepted by ISA/NLB M, the same ISA server that accepted and processed client request 317. One benefit of utilizing the same ISA server to process requests and responses is that state information associated with the data request can be examined.

Figure 6:
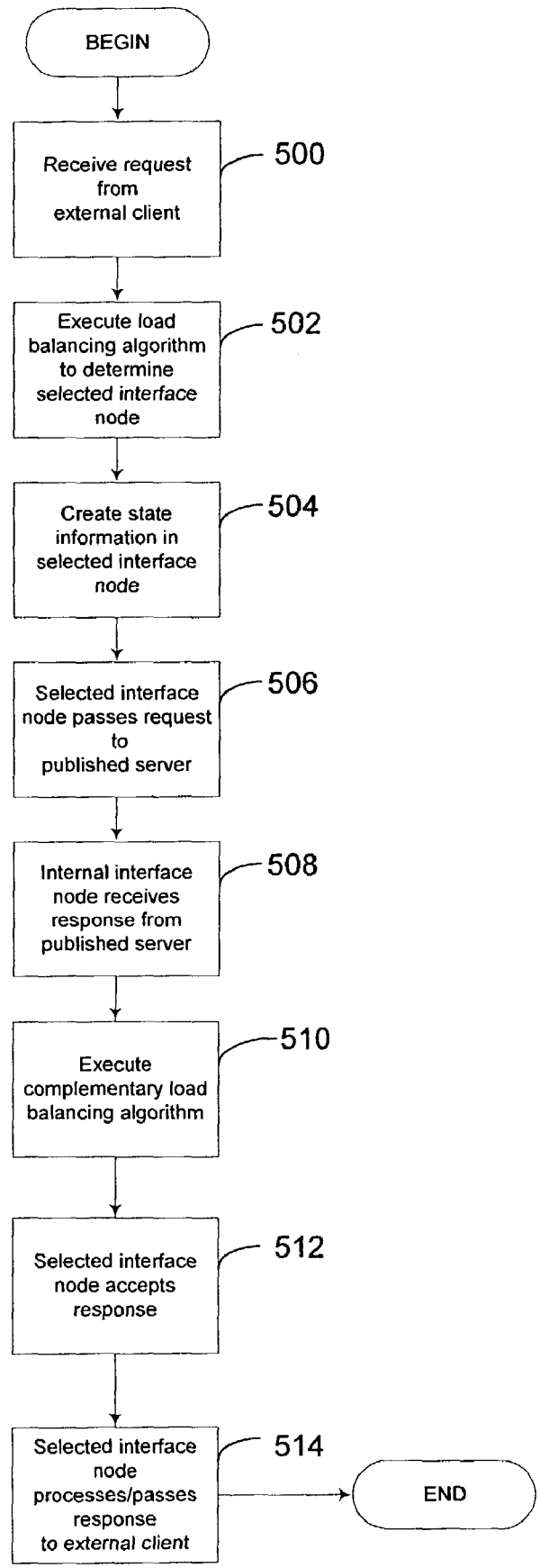
FIG. 6 is a flowchart depicting steps performed by a multi-node external network interface incorporating bi-directional affinity in load balancing.

Having described structures that support an exemplary load-balancing technique of bi-directional affinity embodying the present invention, attention is now directed to FIG. 6 that depicts a set of steps performed by a multi-node external network interface incorporating bi-directional affinity in load balancing. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 500 where the external network interface receives a request from an external client 310. Request message 317 includes a source IP address, a destination IP address and other data. In response to receipt of the message, during step 502 a load-balancing algorithm is executed to select which interface node will process the data request. For example, in an embodiment of the present invention, the external network interface adapters apply a modulo algorithm on a hash of the source IP address to select the interface node. Thereafter, at step 504, the selected interface node creates state information for request message 317. At step 506, request message 337 is passed to the published server by the selected interface node.

After receiving request message 337, published server 350 sends response message 357 to the internal network interface at step 508. Thereafter, at steps 510 and 512, a determination is made whether to invoke the default or complementary load-balancing algorithm. At step 510, the internal network interface executes a complementary load-balancing algorithm to select an interface node. Execution of a complementary load-balancing algorithm ensures that response message 357 is accepted by the same interface node that processed request message 317. In a particular example of complementary load balancing, the internal network interface adapters apply a modulo algorithm on a hash of the destination IP address to select the interface node. At step 512, the interface node selected during execution of the load-balancing algorithm accepts response message 357. Thereafter at step 514, response message 357 is processed by the selected interface node and passed to external client computer 310.

Figure 7:
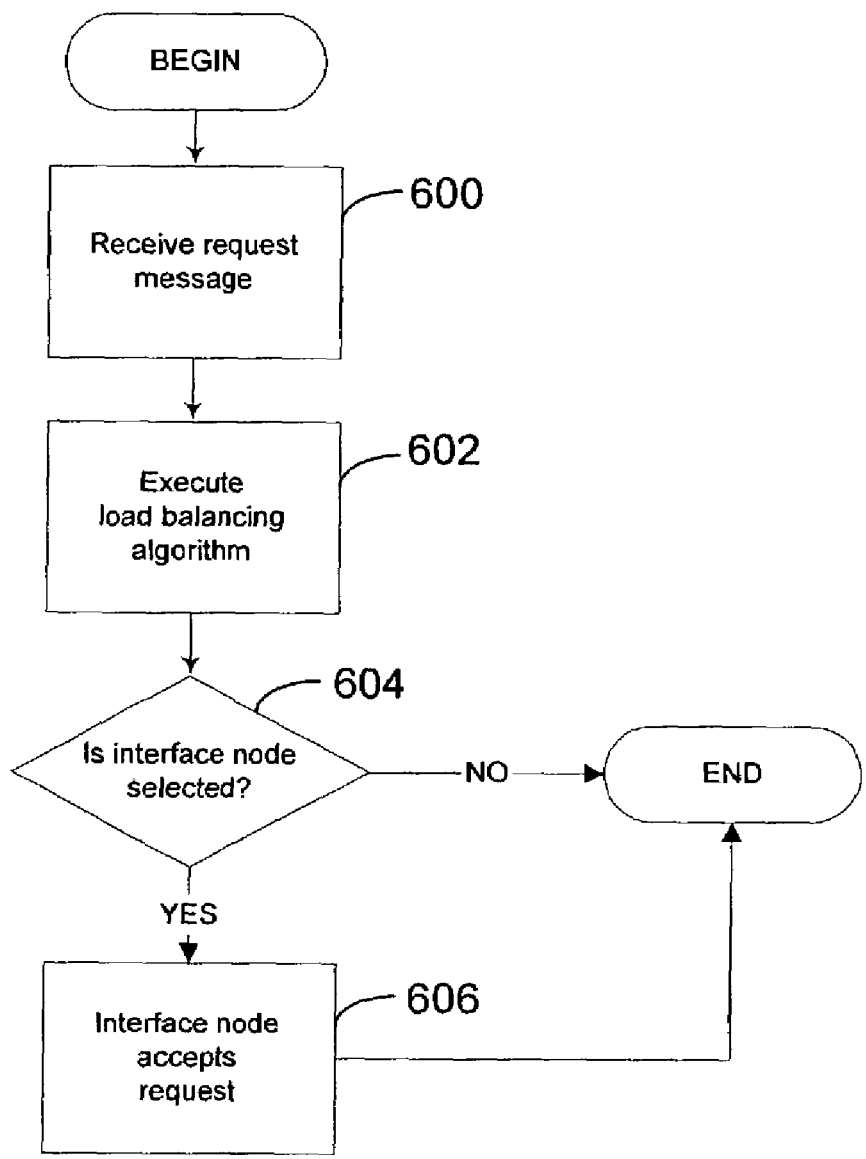
FIG. 7 is a flowchart depicting steps performed when an external interface node receives a request message from an external client in accordance with one embodiment of the present invention.

Attention is now directed to FIG. 7 that depicts a set of steps performed by the external interface nodes in the server cluster after receiving a request message from an external client. The steps described herein below are exemplary.

The procedure begins at step 600 wherein the external interface node adapters receive a message request 317 from external client 310. Thereafter, at step 602 the external interface node adapters execute a load-balancing algorithm to determine whether the node is selected to accept request message 317. The load-balancing algorithm can be any acceptable load-balancing algorithm adopted by the external network adapters. In a particular example of load balancing, the external network interface adapters apply a modulo algorithm on a hash of the source IP address to select the interface node. At step 604, if the external interface node is selected, then control passes to step 606. At step 606, the external interface node accepts request message 317 and the process ends.

Figure 8:
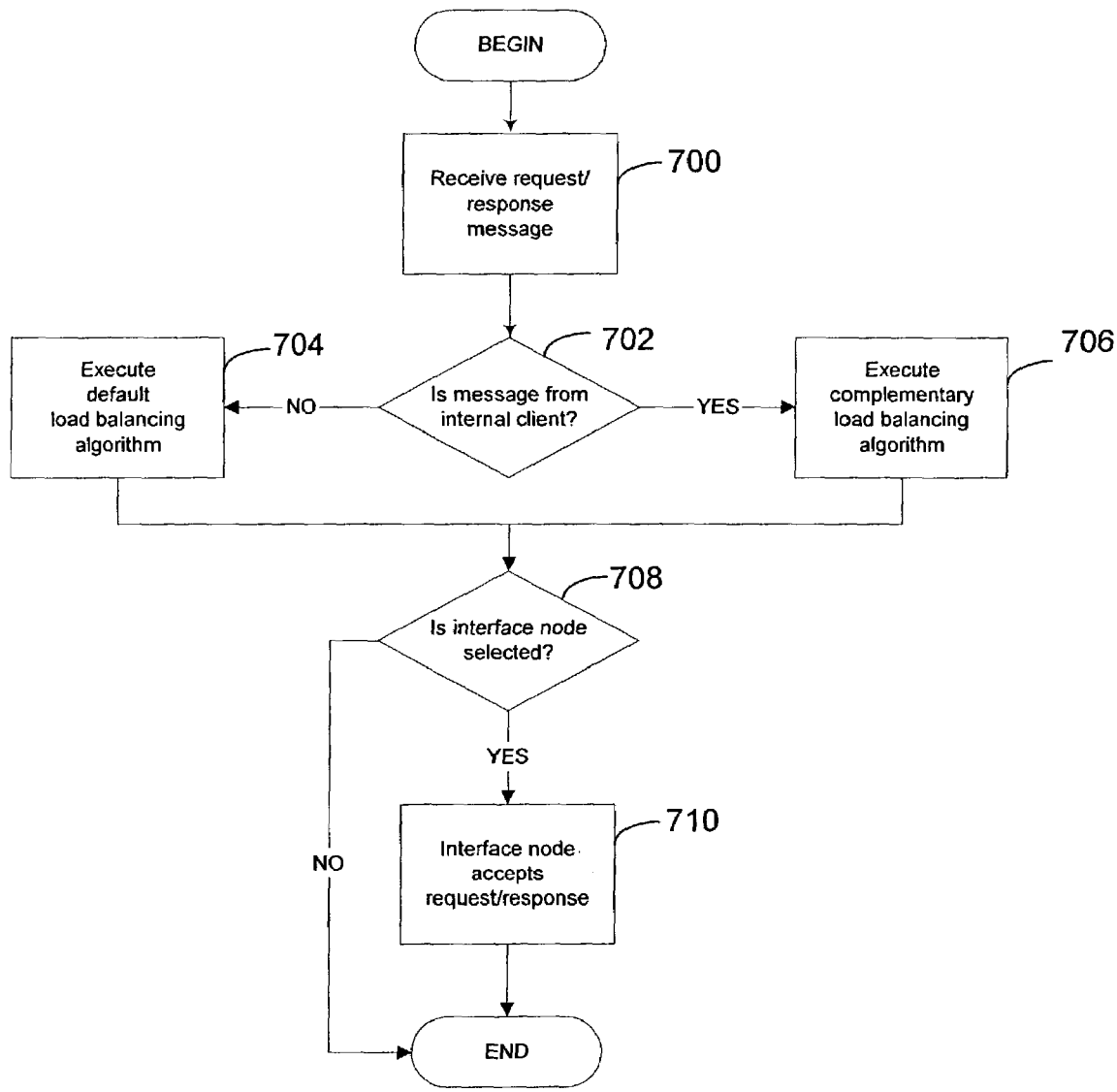
FIG. 8 is a flowchart depicting steps performed when an internal interface node receives a request/response message from an internal client/server in accordance with one embodiment of the present invention.

Attention is now directed to FIG. 8 that depicts a set of steps performed by the internal interface nodes in the server cluster after receiving a request/response message from an internal server. The steps described herein below are exemplary.

The procedure begins at step 700 wherein the internal interface node adapters receive a request/response message from an internal client 360 or an internal server 350. At step 702, a determination is made whether the message is a request from an internal client 360 or a response from an internal server 350. If the message is from an internal client 360, at step 704 the internal network interface executes a default load-balancing algorithm to select an interface node. Alternatively, if the message is from an internal server 350, at step 706 the internal network interface executes a complementary load-balancing algorithm to select an interface node. Execution of a complementary load-balancing algorithm ensures that response message 357 from internal server 350 is accepted by the same interface node that accepted and processed request message 317.

At step 708, if the internal interface node is selected, then control passes to step 710. At step 710, the internal interface node accepts the request/response message and the process ends.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A network load balancing/external network interface node, for use in a system including multiple network load balancing/external network interface nodes, including bi-directional load balancing affinity with regard to requests from external clients and corresponding responses from internal network servers, the network load balancing/external network interface node comprising:

an external network load balancing adapter that executes a load-balancing algorithm to determine whether a received client request is accepted by the network load balancing/external network interface node;

an external network interface utility that processes the received client request and maintains state information associated with the received client request;

an internal network load balancing adapter that ensures the network load balancing/external network interface node accepts a response from an internal network server corresponding to the received client request, the internal network load balancing adapter comprising:

a complementary load-balancing algorithm to ensure that the network load balancing/external network interface node that processed the received client request processes the received server response, wherein the complementary load-balancing algorithm executes simultaneously on the network load balancing/external network interface nodes.

2. The network load balancing/external network interface node of claim 1 wherein the load-balancing algorithm of the external network interface node includes as its input, an external address of a requesting client.

3. The network load balancing/external network interface node of claim 2 wherein the external address of the requesting client is an IP address of the requesting client.

4. The network load balancing/external network interface node of claim 1 wherein the complementary load-balancing algorithm of the external network interface node includes as its input, an external address of a requesting client.

5. The network load balancing/external network interface node of claim 4 wherein the external address of the requesting client is an IP address of the requesting client.

6. The network load balancing/external network interface node of claim 1 wherein the external network interface utility is a firewall.

7. A method for establishing bi-directional affinity for a load balancing firewall comprising multiple load balancing/firewall nodes interposed between an internal network comprising multiple published servers and an external network comprising requesting clients, the method comprising:

first receiving, by an external network load balancing interface of the load balancing firewall, a request from an external client;

first determining, based upon a load-balancing algorithm, a selected load balancing/firewall node that processes the request from the external client;

establishing, by the selected load balancing/firewall node, a connection state corresponding to the request from the external client;

passing, by the selected load balancing/firewall node, the request from the external client to a selected one of the multiple published servers;

second receiving, by an internal network load balancing interface of the load balancing firewall, a message from the selected one of the multiple published servers;

applying, by the internal network load balancing interface of the load balancing firewall, a complementary load-balancing algorithm to the message received during the second receiving step, the complementary load-balancing algorithm determining the selected load balancing/firewall node established during the first determining step, wherein the complementary load-balancing algorithm executes simultaneously on the load balancing/firewall nodes; and processing, by the selected load balancing/firewall node, the message from the selected one of the multiple published servers.

8. The method for establishing bi-directional affinity for a load balancing firewall in claim 7 wherein the applying step further comprises the steps of:

applying, by the internal network load balancing interface of the load balancing firewall, a default load-balancing algorithm to the message received during the second receiving step, the default load-balancing algorithm differing from the complementary load-balancing algorithm.

9. The method for establishing bi-directional affinity for a load balancing firewall in claim 8 wherein the default algorithm is a modulo algorithm applied to a hash of the message received from the selected one of the multiple published servers.

10. The method for establishing bi-directional affinity for a load balancing firewall in claim 7 further comprising:

passing, by the selected load balancing/firewall node, the message from the selected one of the multiple published servers to the external client; and receiving, by the external client, the message from the selected load balancing/firewall node.

11. A computer-readable medium having computer-executable components thereon for a load balancing firewall comprising multiple load balancing/firewall nodes interposed between an internal network comprising multiple published servers and an external network comprising requesting clients, the components performing the steps of:

first receiving, by an external network load balancing interface of the load balancing firewall, a request from an external client;

first determining, based upon a load-balancing algorithm, a selected load balancing/firewall node that processes the request from the external client;

establishing, by the selected load balancing/firewall node, a connection state corresponding to the request from the external client;

passing, by the selected load balancing/firewall node, the request from the external client to a selected one of the multiple published servers;

second receiving, by an internal network load balancing interface of the load balancing firewall, a message from the selected one of the multiple published servers;

applying, by the internal network load balancing interface of the load balancing firewall, a complementary load-balancing algorithm to the message received during the second receiving step, the complementary load-balancing algorithm determining the selected load balancing/firewall node established during the first determining step, wherein the complimentary load-balancing algorithm executes simultaneously on the load balancing/firewall nodes; and processing, by the selected load balancing/firewall node, the message from the selected one of the multiple published servers.

12. The computer-readable medium for establishing bi-directional affinity for a load balancing firewall in claim 11 wherein the applying step further comprises computer-executable instructions facilitating performing the steps of:

applying, by the internal network load balancing interface of the load balancing firewall, a default load-balancing algorithm to the message received during the second receiving step, the default load-balancing algorithm differing from the complementary load-balancing algorithm.

13. The computer-readable medium for establishing bi-directional affinity for a load balancing firewall in claim 12 wherein the default algorithm is a modulo algorithm applied to a hash of the message received from the selected one of the multiple published servers.

14. The computer-readable medium for establishing bi-directional affinity for a load balancing firewall in claim 11 comprising further computer-executable instructions facilitating performing the steps of:

passing, by the selected load balancing/firewall node, the message from the selected one of the multiple published servers to the external client; and receiving, by the external client, the message from the selected load balancing/firewall node.

* * * * *